United States Patent
Baudisch et al.

(10) Patent No.: US 11,360,456 B2
(45) Date of Patent: Jun. 14, 2022

(54) APPARATUS AND METHOD FOR IDENTIFYING DIFFERENCES BETWEEN A REAL INSTALLATION AND A DIGITAL TWIN OF THE INSTALLATION

(71) Applicant: SIEMENS AKTIENGESELLSCHAFT, Munich (DE)

(72) Inventors: Thomas Baudisch, Bayern (DE); Francesco Montrone, Riemerling (DE); Jörn Peschke, Nuremberg (DE); Ulrich Rossgoderer, Munich (DE); Maximilian Metzner, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/002,613

(22) Filed: Aug. 25, 2020

(65) Prior Publication Data
US 2021/0064000 A1 Mar. 4, 2021

(30) Foreign Application Priority Data
Aug. 28, 2019 (EP) .................................. 19194040

(51) Int. Cl.
*G05B 19/4097* (2006.01)

(52) U.S. Cl.
CPC .............. *G05B 19/4097* (2013.01); *G05B 2219/35134* (2013.01)

(58) Field of Classification Search
CPC ............ G05B 19/4097; G05B 2219/35134
See application file for complete search history.

(56) References Cited

U.S. PATENT DOCUMENTS

| 2004/0176116 | A1 | 9/2004 | Berkooz et al. |
| 2010/0174395 | A1* | 7/2010 | Gu ................. G05B 17/02 700/110 |
| 2010/0299169 | A1* | 11/2010 | Schlereth ......... G06Q 10/06313 705/7.23 |
| 2011/0025724 | A1 | 2/2011 | Hur et al. |

(Continued)

FOREIGN PATENT DOCUMENTS

| EP | 2400282 | 12/2011 |
| JP | 2010025724 | 2/2010 |

OTHER PUBLICATIONS

EP Search Report dated Jan. 31, 2020 based on EP19194040 filed Aug. 28, 2019.

*Primary Examiner* — Thomas C Lee
*Assistant Examiner* — Ameir Myers
(74) *Attorney, Agent, or Firm* — Cozen O'Connor

(57) ABSTRACT

A method and apparatus for determining differences between an automated installation and a digital twin of the automated installation and to an automated installation that includes the apparatus, wherein a sensor unit is fastened to a process material and passes through an automated installation together with the process material where, during this process, the sensor unit continuously records at least one measurement variable, a temporal profile of the recorded measurement variable is compared with a temporal profile of a corresponding simulated measurement variable and if there is a difference between the temporal profiles, then the location in the automated installation at which the difference is present is identified.

19 Claims, 2 Drawing Sheets

(56) References Cited

U.S. PATENT DOCUMENTS

| | | | |
|---|---|---|---|
| 2019/0033850 A1* | 1/2019 | B R | G05B 9/02 |
| 2019/0138667 A1* | 5/2019 | Benesh | G06Q 10/063 |
| 2019/0340843 A1* | 11/2019 | McCarson | G05B 13/04 |
| 2020/0174462 A1* | 6/2020 | Sirohi | G05B 13/042 |
| 2021/0016925 A1* | 1/2021 | Moeller | G01G 19/52 |

* cited by examiner

APPARATUS AND METHOD FOR IDENTIFYING DIFFERENCES BETWEEN A REAL INSTALLATION AND A DIGITAL TWIN OF THE INSTALLATION

BACKGROUND OF THE INVENTION

1. Field of the Invention

The present invention relates to a method and an apparatus for determining differences between an automated installation and a digital twin of the automated installation and to an automated installation comprising the apparatus.

2. Description of the Related Art

Automation particularly relates to installation construction in the fields of mechanical engineering and electrical engineering. Automation is used to automate technical processes in machines, installations or technical systems and to therefore create an automated installation. For this purpose, various actuators that implement a process (such as a manufacturing process or method) are used in an automated installation. The actuators are controlled by a controller of the automated installation, where the controller receives information relating to the process or the installation condition via sensors.

The higher the degree of automation of an automated installation, then the more independent of human interventions the automated installation becomes. In addition to relieving the person of dangerous, strenuous or routine activities, automation is used to improve quality and increases the performance of the automated installation. In addition, personnel costs can be reduced via automation. Here, human activities are predominantly reduced to the elimination of disruptions, the supply of material, the transport of finished parts, maintenance and similar work.

The design, implementation of automation functions and activation of automated installations are highly method-oriented. Developed methods and solutions are usually the result of an (abstracting) model consideration of real physical systems (automated installations). Here, the physical systems are often modeled via a computer-aided virtual image or model, a "digital twin". Knowledge-based methods for designing and activating the various automation functions can then be developed based on these digital twins. Knowledge-based approaches then result in automated installations containing model-based regulating systems and controllers, for example.

A production installation is therefore designed with the aid of a digital twin. Differences can occur when converting the digital twin into the real automated installation. These differences may result from local conditions or inaccurate assembly specifications, for example. Expansions and conversions of the real installation without a (manual) update of the digital twin also result in differences between the digital twin and the real automated installation. Even if a digital twin of the manufacturing installation, which is compared with the real automated installation, exists at the time of activating the automated installation, changes (such as optimizations, components are added/removed) may be made to the real automated installation during operation of the real automated installation. After some time in operation, the extent to which the digital twin still correctly represents the real installation is therefore no longer known or comprehensible.

This results in considerable manual effort. For example, a simulation expert must clarify the consistency between the real automated installation and the digital twin via an on-site inspection and/or via conversations with the installation operator.

It is also possible to create a three-dimensional (3-D) scan of the real automated installation via a laser scanner, a drone flyover or cameras fitted in the area. A two-dimensional (2-D) or 3-D CAD model of the real automated installation can be calculated from the 3-D scan. These models can be manually compared with 2-D/3-D CAD models (for example, installation layout) corresponding to the digital twin by the simulation expert. It is also possible to make recordings of real movements of components of the automated installation by means of a video camera. The movements can then be identified via image recognition in the digital twin. In both cases mentioned above, the problem exists of the elements of the automated installation often having a working area casing and/or certain areas not being accessible from the outside, with the result that it is not possible to look "into the elements" and observe the exact arrangement or sequence.

SUMMARY OF THE INVENTION

It is an object of the present invention is to provide an apparatus, an automated installation comprising the apparatus and a method for determining differences between an automated installation and a digital twin of the automated installation.

This and other objects and advantages are achieved in accordance with the invention by a method for determining differences between an automated installation and a digital twin of the automated installation comprising a) fastening a sensor unit to a process material, b) continuously recording at least one measurement variable via the sensor unit while the process material with the fastened sensor unit is processed by the automated installation, c) comparing a temporal profile of the at least one recorded measurement variable with a temporal profile of at least one corresponding simulated measurement variable which was simulated using the digital twin and d) identifying a location in the automated installation at which there is a difference between the at least one recorded measurement variable and the at least one corresponding simulated measurement variable if the temporal profile of the at least one recorded measurement variable differs from the temporal profile of the at least one corresponding simulated measurement variable.

In accordance with a second aspect of the present invention, an apparatus for determining differences between an automated installation and a digital twin of the automated installation is configured to perform the method in accordance with the first aspect of the present invention. The apparatus comprises a sensor unit and a control unit. The sensor unit is configured to be fastened to a process material. The sensor unit is also configured to continuously record at least one measurement variable while the process material with the fastened sensor unit is processed by the automated installation. The control unit is configured to compare a temporal profile of the at least one recorded measurement variable with a temporal profile of at least one corresponding simulated measurement variable which was simulated using the digital twin. The control unit is also configured to identify a location in the automated installation at which there is a difference between the at least one recorded measurement variable and the at least one corresponding simulated measurement variable if the temporal profile of the at least one recorded measurement variable differs from the temporal profile of the at least one corresponding simulated measurement variable.

In accordance with another embodiment of the invention, an automated installation comprises the apparatus in accordance with the disclosed embodiments of the present invention.

In connection with the present invention, the term "continuously" is understood as meaning at predetermined times and, in particular, after each predefined interval of time. A step that is continuously performed is therefore understood as meaning a step which is performed at particular, predetermined times or after each expiry of a predetermined interval of time.

The process material may be, in particular, a workpiece, such as a blank (for example, a circuit board etc.). The process material may also be a material stream, such as a continuous stream of a material in powder form.

The sensor unit may be fastened to the process material via a force fit, a form fit and/or a material bond. The sensor unit can also be fastened to the process material in a releasable or non-releasable manner. For example, the sensor unit may comprise a magnetic fastener (permanent magnet, electromagnet etc.) which is used to fasten the sensor unit to a magnetic process material (for example, a block made of magnetic metal) in a releasable manner. The sensor unit may also comprise an adhesive bonding location (for example, adhesive strip) and can therefore be fitted to the process material via adhesive bonding (in a releasable or non-releasable manner depending on the type of adhesive). A screw connection can also be used to fasten the sensor unit to the process material. In accordance with the disclosed embodiments of the invention, "fastened" is also understood as meaning introduction of the sensor unit into the material stream, with the result that the sensor unit is carried along with the material stream or is moved together with the material stream.

The sensor unit fastened to the process material continuously records a measurement variable. Here, the sensor unit continuously determines the measurement variable and stores this variable, with the result that the temporal profile of the measurement variable while the process material with the fastened sensor unit is processed by the automated installation is available after the completion of processing. Here, the sensor unit passes through the automated installation together with the process material and in the process can observe process variables and parameters as well as the arrangement of elements of the automated installation "from the inside". Processes and arrangements of elements of the automated installation that cannot be discerned from the outside can therefore also be recorded by the sensor unit in the form of the continuously recorded at least one measurement variable.

In this case, the measurement variable may be, for example, a physical variable (for example, temperature, pressure, or acceleration), a position of the sensor unit in the automated installation while it passes through the automated installation and the like. For this purpose, the sensor unit may have suitable sensor elements or measuring sensors that can be used to capture the physical variables. The sensor unit may also have a storage unit, in which the temporal profile of the at least one measurement variable can be buffered, and/or a communication unit that can be used to transmit the temporal profile of the at least one measurement variable to the control unit.

The temporal profile of the at least one (real) measurement variable, which is recorded by the sensor unit, is compared with the temporal profile of the at least one corresponding simulated measurement variable. The temporal profile of the at least one corresponding simulated measurement variable is simulated using the digital twin or is read from the digital twin during simulation of the operation of the automated installation. The digital twin of the automated installation is a computer-aided simulation model of the automated installation. This simulation model consists of a hardware-in-the-loop (HiL) simulation of the real automated installation and can comprise a coupling of a wide variety of simulation models (for example, 3-D mechanics with kinematic simulation and sensor/actuator functionality, detailed physics simulation using Amesim etc.).

A check is initially performed to determine whether a difference between the temporal profile of the recorded at least one (real) measurement variable and the temporal profile of the at least one corresponding simulated measurement variable exists. For this purpose, the recorded measured values and the corresponding simulated measured values are compared with one another at any time in the temporal profile. Differences in the temporal profile of the measurement variables between the real automated installation and the digital twin can be automatically detected by comparing the measured values from the real and virtual sensor units. There are differences between the real automated installation and the digital twin at these locations or at these times.

If there is a difference between the temporal profiles of the at least one recorded measurement variable and of the at least one corresponding simulated measurement variable, then the location at which the difference from the digital twin occurs in the automated installation is identified. This location can be identified using a runtime, for example. For this purpose, it is determined how far the process material with the fastened sensor unit has advanced in the automated installation at the time at which the difference occurs in the temporal profile of the at least one recorded measurement variable. The location at which the difference occurs can therefore be identified, for example, in the case of a constant advancement speed of the process material in the automated installation, using the runtime until the difference occurs and using the constant speed via multiplication.

As soon as the location at which the difference occurs has been identified, the reason for the difference can be searched for at this location in the automated installation and either the automated installation can be adapted to the digital twin or the digital twin can be digital twin to the automated installation.

The digital twin may be implemented on a separate computer system and the control unit may be communicatively connected to the digital twin via a wireless or wired interface. Alternatively, the control unit and the digital twin may be implemented on a common computer system.

The disclosed embodiments of the present invention make it possible to automatically check in a reliable manner at any time whether the real automated installation and the digital twin match. Furthermore, if this is not the case, then it is possible to automatically identify the locations at which differences exist and to accordingly eliminate these differences. This reduces the effort and the time needed to find and eliminate said differences.

In one embodiment of the present invention, the method also comprises i1) modeling a virtual sensor unit on a virtual process material inside the digital twin and i2) simulating the at least one corresponding measurement variable. In this case, the at least one corresponding measurement variable is recorded by the virtual sensor unit while the virtual process material with the virtual sensor unit is processed by the digital twin.

In accordance with a further embodiment of the present invention, the control unit is configured to be communicatively connected to the digital twin. The control unit is also configured to model a virtual sensor unit on a virtual process material inside the digital twin. The control unit is also configured to simulate the at least one corresponding measurement variable. Here, the at least one corresponding measurement variable is recorded by the virtual sensor unit while the virtual process material with the virtual sensor unit is processed by the digital twin.

The temporal profile of the at least one corresponding simulated measurement variable is simulated using the digital twin by modeling a virtual sensor unit corresponding to the real sensor unit in the digital twin. The virtual sensor unit is conveyed through the digital twin with the virtual process material, i.e., "fitted to the virtual process material", in a similar manner to the real sensor unit, with the result that the virtual sensor unit passes through the digital twin in a similar manner to the real sensor unit while the virtual process material is processed. Here, the virtual sensor unit continuously records the at least one corresponding simulated measurement variable.

Simulating the at least one corresponding simulated measurement variable via the virtual sensor unit ensures that the corresponding simulated measurement variable corresponds completely to the real measurement variable. In addition, this type of simulation provides a particularly simple and efficient manner of generating the at least one corresponding simulated measurement variable.

In accordance with another embodiment of the present invention, at least one position of the sensor unit is recorded as a measurement variable by the sensor unit. Optionally, at least one virtual position of the virtual sensor unit is additionally recorded as a corresponding simulated measurement variable by the virtual sensor unit. Here, the location at which a difference occurs between the at least one recorded measurement variable and the at least one corresponding simulated measurement variable is identified by evaluating a track of the sensor unit based on the recorded position. Optionally, the location at which a difference occurs between the at least one recorded measurement variable and the at least one corresponding simulated measurement variable is identified by evaluating the track of the sensor unit based on the recorded position and a virtual track of the virtual sensor unit based on the simulated virtual position.

In accordance with a further embodiment of the present invention, the sensor unit is configured to record a position of the sensor unit as a measurement variable.

The sensor unit captures its position in the automated installation while passing through the automated installation during processing of the process material to which it is fitted. For this purpose, the sensor unit may comprise a GPS sensor and/or at least one acceleration sensor, from the captured acceleration values of which the temporal profile of the position is derived, and/or optical sensor elements (for example, a camera or optical markers).

The temporal profile of the position results in a (real) track of the (real) sensor unit along the automated installation. In a similar manner, the virtual sensor can optionally record its virtual position in the digital twin. The temporal profile of the virtual position results in a virtual track of the virtual sensor unit along the digital twin.

The location at which there is a difference between the at least one recorded measurement variable, that is to say the position of the (real) sensor unit here, and the at least one corresponding simulated measurement variable, that is to say a simulated position here, can be derived from the (real) track. For this purpose, a comparison is performed to determine the time in the temporal profile at which the recorded (real) position does not correspond to the corresponding simulated measurement variable or the simulated position.

If the virtual sensor unit is also used and the virtual position of the virtual sensor unit and, in a manner derived therefrom, the virtual track are therefore simulated, then the real track is compared with the virtual track to identify the location at which the difference in the position of the real sensor unit from the virtual position of the virtual sensor unit occurs. A comparison function of the two tracks can be used for this purpose.

Comparing the position or the track of the real sensor unit with the simulated position or the virtual track of the virtual sensor unit makes it possible to automatically detect differences in the arrangement of elements of the automated installation in comparison with the corresponding elements in the digital twin and to automatically identify their location.

In accordance with another embodiment of the present invention, steps b), i2) and c) are performed in real time at the same time.

In accordance with a further embodiment, the sensor unit is communicatively connected to the control unit. The sensor unit is also configured to transmit the at least one recorded physical variable to the control unit in real time.

If the process material with the fitted sensor unit is supplied to the automated installation, then the simulation using the digital twin is started at the same time, with the result that the virtual sensor unit passes through the digital twin in sync with the (real) sensor unit passing through the automated installation. Here, the (real) sensor unit and the virtual sensor unit must start the passage at the same time, but the passage of the (real) sensor unit and of the virtual sensor unit may end at different times if there is a difference between the real automated installation and the digital twin.

The at least one recorded measured value (here the position and/or at least one further physical variable, for example) and/or its temporal profile (here the track and/or a temporal profile of the at least one further physical variable, for example) can be displayed to a user (for example, simulation expert) in real time on a display device (for example, monitor) together with the at least one corresponding simulated measured value (here the virtual position and/or at least one further corresponding simulated physical variable, for example) and/or its temporal profile (here the virtual track and/or a temporal profile of the at least one further corresponding simulated physical variable, for example).

The temporal profile of the at least one recorded measured value and the temporal profile of the at least one corresponding simulated measured value are compared at the same time as the sensor unit and the virtual sensor unit pass through the automated installation and through the digital twin, respectively. Here, differences and their location in the automated installation and/or the digital twin can be displayed to the user in real time on the display device.

As a result, it is possible to immediately analyze differences between the automated installation and its digital twin, which contributes to particularly fast detection and therefore elimination of the differences. In addition, the user (simulation expert) can immediately determine whether the temporal profile is realistic for each location.

In accordance with another embodiment of the present invention, the sensor unit records as a measurement variable, and optionally the virtual sensor unit records as a corresponding simulated measurement variable, a temperature, a pressure, an acceleration, a speed, a light intensity, a sound pressure and/or an image.

In accordance with yet another further embodiment, the sensor unit is configured to record a temperature, a pressure, an acceleration, a speed, a light intensity, a sound pressure and/or an image as a measurement variable.

The quality of the comparison between the real automated installation and the digital twin can be further improved by capturing a plurality of measurement variables (in addition to the position). Special characteristics can be identified at particular locations in the digital twin. For example, if there is milling at one location in the automated installation and the digital twin, then a characteristic frequency can be determined using the simulation parameters of the digital twin (for example number of cutting edges and the milling cutter speed). This can be stored as an expected value for this location. If the frequency of the actually recorded sound pressure differs at this location, then a difference at this location can be inferred (for example milling moved to another location in the automated installation). The significance and precision of the identification of locations at which a difference exists are therefore increased.

In yet another embodiment of the present invention, the method also comprises j1) modeling a virtual sensor unit on a virtual process material inside the digital twin. Here, the virtual sensor unit has a parameterizable sensor geometry which records a relative position of a location at which a physical variable was captured by the sensor geometry; comprises j2) simulating the at least one corresponding measurement variable, where the at least one corresponding measurement variable and the relative position are recorded by the virtual sensor unit having a parameterizable sensor geometry while the virtual process material with the virtual sensor unit is processed by the digital twin, and comprises j3) providing the sensor unit according to the recorded relative positions.

In accordance with a further embodiment of the present invention, the sensor unit is provided according to steps j1) to j3).

In the simulation, a parameterizable sensor geometry is placed around the virtual sensor unit. The task of the sensor geometry is to detect all elements and/or their physical variables, which touch the sensor geometry when passing through or whose physical variables are captured at a location of the sensor geometry (for example, line for a laser beam of a light barrier), during the simulation using the digital twin. The resulting locations at which the elements touch the sensor geometry and/or at which the physical variables are detected are recorded in parallel with the respective physical variables.

The real sensor unit is constructed and provided according to the recorded locations such that the physical variables detected in the simulation would have to be able to be recorded using the real sensor unit in the real automated installation. Therefore, an attempt can then be made to detect a light signal from a light barrier at a particular height at the real sensor unit, for example.

An optimally configured real sensor unit for recording the desired measurement variables can be provided in this manner. This increases the reliability and precision of the identification of differences between the automated installation and the digital twin.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and the technical environment are explained in more detail below on the basis of the figures. It is pointed out that the invention is not intended to be restricted by the exemplary embodiments shown. In particular, unless explicitly described otherwise, it is also possible to extract partial aspects of the substantive matter explained in the figures and combine them with other parts and knowledge from the present description and/or figures, where it is particularly pointed out that the figures and, in particular, the proportions illustrated are only schematic. Identical reference signs denote identical objects, with the result that explanations from other figures can be additionally used, if necessary and in which.

DETAILED DESCRIPTION OF THE EXEMPLARY EMBODIMENTS

Figure 1:
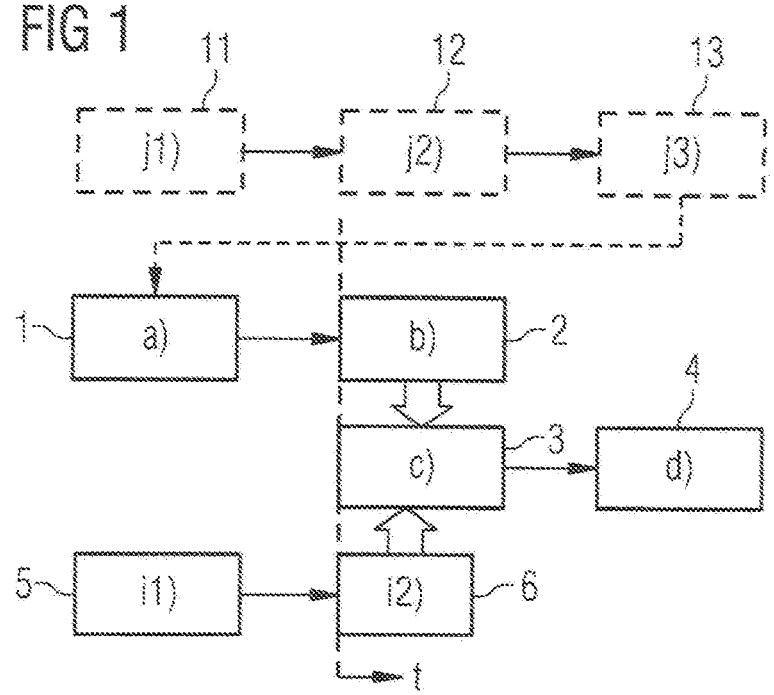
FIG. 1 shows a schematic flowchart of the method for determining differences between an automated installation and a digital twin of the automated installation.

FIG. 1 schematically illustrates the method for determining differences between an automated installation and a digital twin of the automated installation. The method comprises a) fastening 1 a sensor unit, b) continuously recording 2 at least one measurement variable, c) comparing 3, d) identifying 4 a location, i1) modeling 5 a virtual sensor unit, and i2) simulating 6. The method optionally additionally comprises initially j1) modeling 11 a virtual sensor unit, j2) simulating 12, and j3) providing 13 the sensor unit.

In step a), the sensor unit is fastened to a process material. Here, the sensor unit comprises a position sensor (for example, in the form of three acceleration sensors for the three spatial directions), a temperature sensor (for example, a pyrometer) and a light sensor (e.g., a photodetector, such as a photodiode). The sensor unit also comprises a storage unit (for example, a magnetic storage module) in order to buffer recorded measurement variables, a communication unit in order to transmit recorded measurement variables, and a fastener in the form of a permanent magnet. The process material here is a workpiece in the form of a block made of magnetic metal. The sensor unit is fastened to the workpiece via the permanent magnet.

In step b), the measurement variables of position (in three spatial directions), temperature and light intensity are recorded by the sensor unit in real time. Here, the position, temperature and light intensity are continuously determined and buffered in the storage module. The temporal profile of the three measurement variables is therefore recorded. The three measurement variables can either be transmitted in real time by the communication unit or the temporal profiles from the storage module can be subsequently transmitted by the communication module or read via the communication module. The three measurement variables of position, temperature and light intensity are continuously recorded in real time while the sensor unit with the workpiece moves through the automated installation.

In step), a virtual sensor unit on a virtual process material is modeled inside the digital twin. The virtual sensor unit is modeled such that it can record the same (virtual) measurement variables as the real sensor unit during simulation of the operation of the automated installation.

Step i2) is performed at the same time as step b), but may end earlier or later than the latter (here step i2) begins at the same time as step b) but already ends earlier). In step i2), the three corresponding simulated measurement variables of virtual position, virtual temperature and virtual light intensity are simulated in real time. For this purpose, the three corresponding simulated measurement variables are continuously recorded in real time while the virtual process material with the virtual sensor moves through the digital twin. Here, the processing of the virtual process material with the fitted virtual sensor unit by the digital twin is completed earlier, for example, than the processing of the real workpiece with the fitted real sensor unit by the real automated installation.

Step c) is performed at the same time as steps b) and i2), in which case step c) lasts just as long as the longer of the two steps b) and i2). Here, step c) lasts just as long as step b), for example. In step c), the recorded measured values and the corresponding simulated measured values or their temporal profiles are compared with one another in real time.

In step d), if there is a difference between the recorded measured values and the corresponding simulated measured values, then the location in the automated installation at which this difference is present is identified. For this purpose, the position of the real sensor unit at the time at which the difference is present between the recorded position and the virtual position and/or between the recorded temperature and the virtual temperature and/or the recorded light intensity and the virtual light intensity is identified. This position of the sensor unit corresponds to the sought location of the difference.

In optional step j1), a parameterizable sensor geometry is placed around the virtual sensor unit in the simulation. The task of the sensor geometry is to detect all elements and/or their physical variables, which touch the sensor geometry when passing through or whose physical variables are captured at a location of the sensor geometry, during the simulation using the digital twin in optional step j2). The resulting locations at which the elements touch the sensor geometry and/or at which the physical variables are detected are recorded in parallel with the respective physical variables.

In optional step j3), the real sensor unit is constructed and provided according to the recorded locations such that the physical variables detected in the simulation would have to be able to be recorded using the real sensor unit in the real automated installation.

Figure 2:
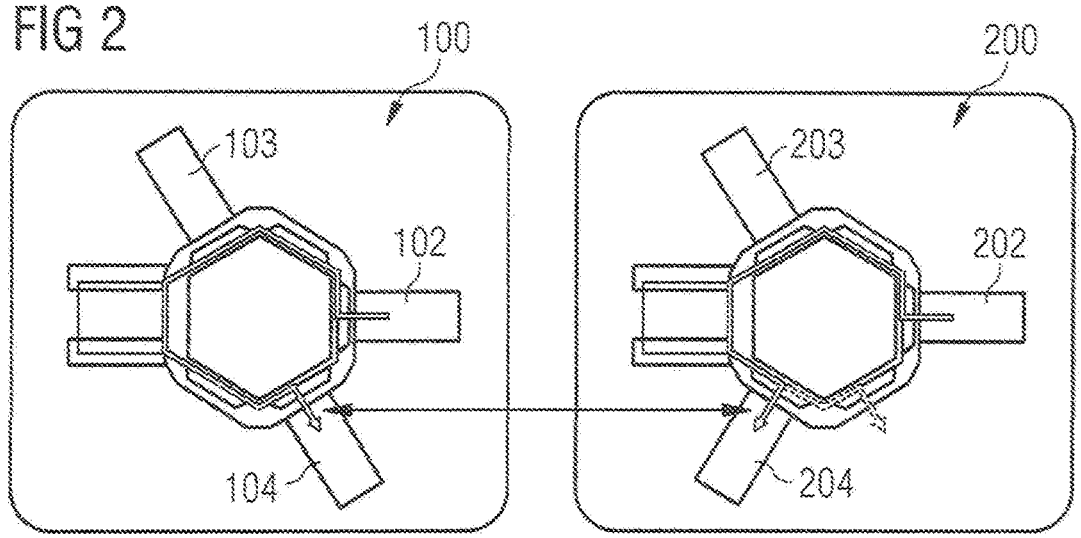
FIG. 2 shows a schematic illustration of a real track along an automated installation and a virtual track along a digital twin of the automated installation.

FIG. 2 schematically illustrates a real track 101 along an automated installation 100 and a virtual track 201 along a digital twin 200 of the automated installation 100. Here, the real automated installation 100 has the modules 102, 103 and 104. The digital twin has the virtual modules 202, 203 and 204.

The real track 101 as a temporal profile is generated from the positions of the real sensor unit which are recorded in step b) while the real sensor unit passes through the automated installation 100. The virtual track 201 as a temporal profile is generated from the virtual positions of the virtual sensor unit that are simulated in step i2) while the virtual sensor unit passes through the digital twin. Here, the arrangement of the module 104 in the automated installation 100 differs from the arrangement of the corresponding virtual module 204 in the digital twin 200. The virtual sensor unit passes through a shorter section starting from the virtual module 202 to the virtual module 204 in the digital twin 200 than the real sensor unit from the module 102 to the module 104 in the automated installation 100. This may be because the module 104 in the automated installation 100 was arranged at a different location than that originally provided in the digital twin 200 during installation or a conversion.

The real track 101 and the virtual track 201 are compared with one another in step c). The difference in the arrangement between the real module 104 in the automated installation 100 and the corresponding virtual module 204 in the digital twin (indicated by the dashed line) is immediately clear by comparing the two tracks 101 and 201. In a similar manner, a difference in the temporal profile of another recorded measurement variable can also be detected and its location can be identified. If, for example, the temperature at two locations differs from the respective corresponding simulated virtual temperature such that the temperature that was actually expected at the location of the second difference was recorded at the location of the first difference, and vice versa, then the two modules (for example, a first heat treatment unit and a second heat treatment unit) were probably swapped or set differently.

Figure 3:
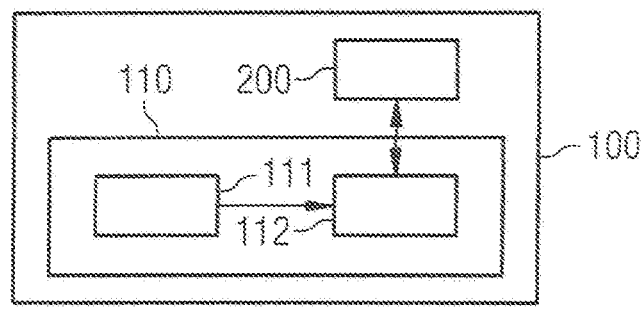
FIG. 3 shows a schematic view of the automated installation having the apparatus for determining differences between the automated installation and a digital twin of the automated installation.

FIG. 3 schematically illustrates the automated installation 100 having the apparatus 110 for determining differences between the automated installation 100 and a digital twin 200 of the automated installation 100. The apparatus 110 is configured to implement the method from FIG. 1. For this purpose, the apparatus 110 comprises a sensor unit 111 and a control unit 112. The sensor unit 111 is configured to be fastened to a process material, here a workpiece in the form of a block made of magnetic metal. For this purpose, the sensor unit 111 has a fastening device in the form of a permanent magnet. The sensor unit 111 is also configured to continuously record three measurement variables, a position in the three spatial directions, a temperature and a light intensity, while the process material with the fastened sensor unit 111 is processed by the automated installation 100. For this purpose, the sensor unit 111 comprises three acceleration sensors, one for each of the spatial directions, a temperature sensor (pyrometer) and a light sensor (photodetector, for example, a photodiode). The sensor unit 111 also comprises a communication unit with which it can transmit the three recorded measurement variables to the control unit 112 in real time, for example via a radio connection.

In this case, the sensor unit 111 was provided according to steps j1)-j3) of the method from FIG. 1.

The control unit 112 is communicatively connected to the digital twin 200 and to the sensor unit 111. Here, the control unit 112 is implemented together with the digital twin 200 on a computer system of the automated installation. The control unit 112 is configured to model a virtual sensor unit on a virtual process material inside the digital twin 200 and to simulate three corresponding measurement variables, a virtual position, a virtual temperature and a virtual light intensity. Here, the three corresponding measurement variables are recorded by the virtual sensor unit while the virtual process material with the virtual sensor unit is processed by the digital twin 200. The control unit 112 is also configured to compare a temporal profile of the three recorded measurement variables (position, temperature, light intensity) with the temporal profile of the three corresponding simulated measurement variables, virtual position, virtual temperature and virtual light intensity, which were simulated using the digital twin 200. The control unit 112 is also configured to identify a location in the automated installation 100 at which there is a difference between at least one of the three recorded measurement variables and the corresponding simulated measurement variable if the temporal profile of at least one of the three recorded measurement variables differs from the temporal profile of the corresponding simulated measurement variable.

Figure 4:
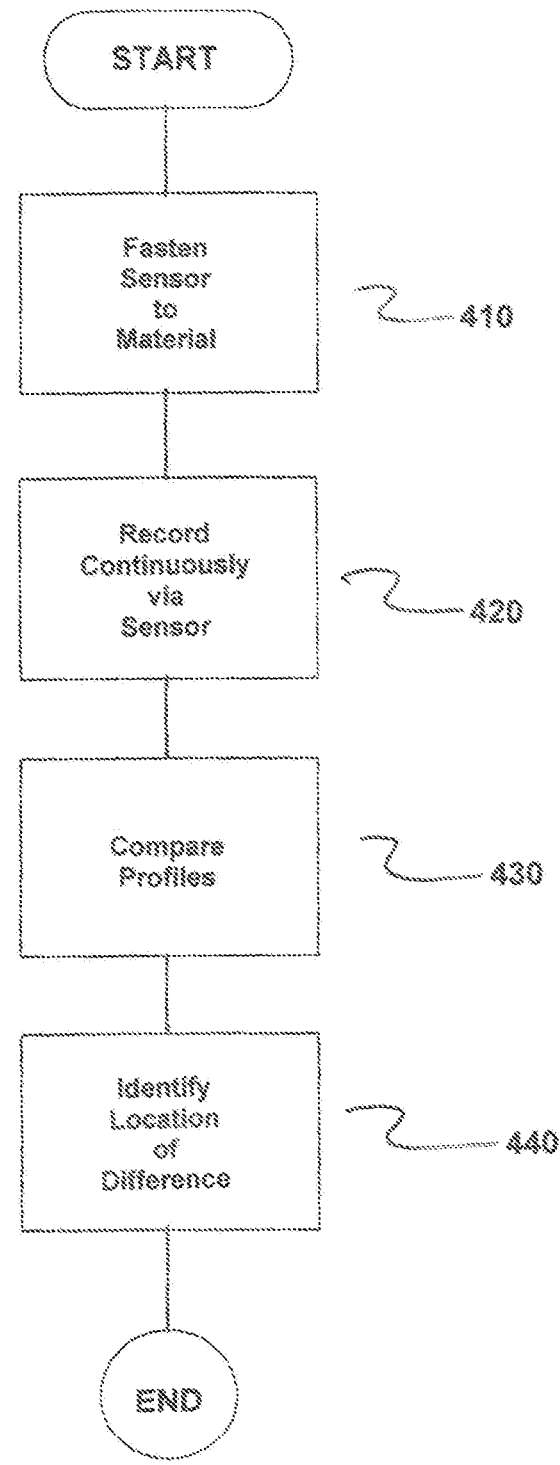
FIG. 4 is an alternative flowchart of the method in accordance with the invention.

FIG. 4 is a flowchart of the method for determining differences between an automated installation 100 and a digital twin 200 of the automated installation 100. The method comprises fastening (1) a sensor unit 111 to a process material, as indicated in step 410. Next, continuously recording at least one measurement variable is continuously recorded (2) via the sensor unit 111 while the process material with the fastened sensor unit 111 is processed by the automated installation 100, as indicated in step 420.

Next, a temporal profile of the at least one recorded measurement variable is compared (3) with a temporal profile of at least one corresponding simulated measurement variable which was simulated using the digital twin 200, as indicated in step 430.

A location in the automated installation 100 at which a difference between the at least one recorded measurement variable and the at least one corresponding simulated measurement variable exists is now identified (4) if the temporal profile of the at least one recorded measurement variable differs from the temporal profile of the at least one corresponding simulated measurement variable, as indicated in step 440.

Although specific embodiments have been illustrated and described here, it is clear to a person skilled in the art that there are a multiplicity of alternatives and/or equivalent implementations. It should be appreciated that the exemplary configurations or embodiments are only examples and are not intended to restrict the scope, the applicability or the configuration in any way. Rather, the above summary and detailed description will provide a person skilled in the art with sufficient instructions for implementing at least one preferred embodiment, in which case it goes without saying that different changes in the function and arrangement of the elements described in an exemplary configuration do not go beyond the field of application described in the accompanying claims and their legal equivalents. This application is generally intended to cover all adaptations or variations of the specific embodiments discussed here.

In the detailed description above, various features were combined in one or more examples in order to keep the disclosure concise. It goes without saying that the above description is intended to be illustrative and non-restrictive. It is intended to cover all alternatives, changes and equivalents which may be included within the scope of the invention. Many other examples will become obvious to a person skilled in the art when studying the above disclosure.

In order to enable a comprehensive understanding of the invention, a specific nomenclature which was used in the above disclosure is used. However, it will be clear to a person skilled in the art in the light of the specification contained therein that the specific details are not needed to use the invention. The above descriptions of special embodiments of the present invention are thus presented for the purposes of illustration and description. They are not intended to be exhaustive or to restrict the invention to the exact embodiments disclosed above; many modifications and variations are obviously possible with respect to the teachings mentioned above. The embodiments were selected and described in order to best explain the principles of the invention and its practical applications and to therefore provide other professionals with the possibility of best using the invention and different embodiments with different modifications, as appears to be suitable for the respective use. The terms "including" and "in which" are used in the entire specification as equivalents of the respective terms "comprising" and "wherein". In addition, the terms "first", "second", "third" etc. are used only as a designation and are not intended to impose numerical requirements on the objects or to specify a particular ranking. In connection with the present description and the claims, the conjunction "or" should be understood as inclusion ("and/or") and not exclusive ("either . . . or").

What is claimed is:

1. A method for determining differences between an automated installation and a digital twin of the automated installation, the method comprising:
   a) fastening a sensor unit to a process material;
   b) continuously recording at least one measurement variable comprising at least one of (i) a pressure and (ii) a sound pressure via the sensor unit while the process material with the fastened sensor unit is processed by the automated installation;
   c) comparing a temporal profile of the at least one recorded measurement variable with a temporal profile of at least one corresponding simulated measurement variable which was simulated using the digital twin; and
   d) identifying a location in the automated installation at which a difference between the at least one recorded measurement variable comprising at least one of (i) the pressure and (ii) the sound pressure and the at least one corresponding simulated measurement variable exists if the temporal profile of the at least one recorded measurement variable comprising at least one of (i) the pressure and (ii) the sound pressure differs from the temporal profile of the at least one corresponding simulated measurement variable.

2. The method as claimed in claim 1, further comprising:
   i1) modelling a virtual sensor unit on a virtual process material inside the digital twin; and
   i2) simulating the at least one corresponding measurement variable comprising at least one of (i) the pressure and (ii) the sound pressure, the at least one corresponding measurement variable comprising at least one of (i) the pressure and (ii) the sound pressure being recorded by the virtual sensor unit while the virtual process material with the virtual sensor unit is processed by the digital twin.

3. The method as claimed in claim 1, wherein at least one position of the sensor unit is recorded as a measurement variable by the sensor unit.

4. The method as claimed in claim 2, wherein at least one position of the sensor unit is recorded as a measurement variable by the sensor unit;

wherein at least one virtual position of the virtual sensor unit is recorded as the corresponding simulated measurement variable by the virtual sensor unit;

wherein the location at which a difference occurs between the at least one recorded measurement variable comprising at least one of (i) the pressure and (ii) the sound pressure and the at least one corresponding simulated measurement variable is identified by evaluating a track of the sensor unit based on the recorded position; and wherein a virtual track of the virtual sensor unit based on the simulated virtual position.

5. The method as claimed in claim 2, wherein steps b), i2) and c) are performed in real time at the same time.

6. The method as claimed in claim 3, wherein steps b), i2) and c) are performed in real time at the same time.

7. The method as claimed in claim 2, wherein the sensor unit further records as a measurement variable and the virtual sensor unit records, as a corresponding simulated measurement variable, at least one of (i) a temperature, (ii) an acceleration, (iii) a speed, (iv) a light intensity, and (v) an image.

8. The method as claimed in claim 1, further comprising:
j1) modeling a virtual sensor unit on a virtual process material inside the digital twin, the virtual sensor unit including a parameterizable sensor geometry which records a relative position of a location at which a physical variable was captured by the sensor geometry;
j2) simulating the at least one corresponding measurement variable comprising at least one of (i) the pressure and (ii) the sound pressure, the at least one corresponding measurement variable comprising at least one of (i) the pressure and (ii) the sound pressure and the relative position being recorded by the virtual sensor unit having the parameterizable sensor geometry while the virtual process material with the virtual sensor unit is processed by the digital twin; and
j3) providing the sensor unit according to the recorded relative positions.

9. An apparatus for determining differences between an automated installation and a digital twin of the automated installation, comprising:
a sensor unit which is configured to be fastened to a process material and to continuously record at least one measurement variable comprising at least one of (i) a pressure and (ii) a sound pressure while the process material with the fastened sensor unit is processed by the automated installation; and
a control unit which configured to compare a temporal profile of the at least one recorded measurement variable comprising at least one of (i) the pressure and (ii) the sound pressure with a temporal profile of at least one corresponding simulated measurement variable which was simulated using the digital twin and to identify a location in the automated installation at which a difference between the at least one recorded measurement variable comprising at least one of (i) the pressure and (ii) the sound pressure and the at least one corresponding simulated measurement variable exist if the temporal profile of the at least one recorded measurement variable comprising at least one of (i) the pressure and (ii) the sound pressure differs from the temporal profile of the at least one corresponding simulated measurement variable.

10. The apparatus as claimed in claim 9, wherein the apparatus is configured to:
i1) model a virtual sensor unit on a virtual process material inside the digital twin; and
i2) simulate the at least one corresponding measurement variable, the at least one corresponding measurement variable being recorded by the virtual sensor unit while the virtual process material with the virtual sensor unit is processed by the digital twin;
wherein the control unit is configured to be communicatively connected to the digital twin, model a virtual sensor unit on a virtual process material inside the digital twin and to simulate the at least one corresponding measurement variable; and
wherein the at least one corresponding measurement variable is recorded by the virtual sensor unit while the virtual process material with the virtual sensor unit is processed by the digital twin.

11. The apparatus as claimed in claim 9, wherein the sensor unit is configured to record a position of the sensor unit as a measurement variable.

12. The apparatus as claimed in claim 7, wherein the sensor unit is configured to record a position of the sensor unit as a measurement variable.

13. The apparatus as claimed in claim 11, wherein the sensor unit is communicatively connected to the control unit and is configured to transmit at least one recorded physical variable to the control unit in real time.

14. The apparatus as claimed in claim 9, wherein the sensor unit is configured to record at least one of (i) a temperature, (ii) an acceleration, (iii) a speed, (iv) a light intensity, and (v) an image as a measurement variable.

15. The apparatus as claimed in claim 10, wherein the sensor unit is configured to record at least one of (i) a temperature, (ii) an acceleration, (iii) a speed, (iv) a light intensity, and (v) an image as a measurement variable.

16. The apparatus as claimed in claim 11, wherein the sensor unit is configured to record at least one of (i) a temperature, (ii) an acceleration, (iii) a speed, (iv) a light intensity, and (v) an image as a measurement variable.

17. The apparatus as claimed in claim 13, wherein the sensor unit is configured to record at least one of (i) a temperature, (ii) an acceleration, (iii) a speed, (iv) a light intensity, and (v) an image as a measurement variable.

18. The apparatus as claimed in claim 9, wherein the sensor unit is provided by:
j1) modelling a virtual sensor unit on a virtual process material inside the digital twin, the virtual sensor unit including a parameterizable sensor geometry which records a relative position of a location at which a physical variable was captured by the sensor geometry;
j2) simulating the at least one corresponding measurement variable, the at least one corresponding measurement variable and the relative position being recorded by the virtual sensor unit having the parameterizable sensor geometry while the virtual process material with the virtual sensor unit is processed by the digital twin; and
j3) providing the sensor unit according to the recorded relative positions.

19. An automated installation comprising the apparatus as claimed in claim 9.

* * * * *